United States Patent
Berneth et al.

(10) Patent No.: US 7,214,451 B2
(45) Date of Patent: May 8, 2007

(54) REWRITEABLE OPTICAL RECORDING MATERIAL HAVING GOOD SOLUBILITY

(75) Inventors: Horst Berneth, Leverkusen (DE); Thomas Bieringer, Odenthal (DE); Rainer Hagen, Leverkusen (DE); Serguei Kostromine, Swisttal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 200 days.

(21) Appl. No.: 10/252,178

(22) Filed: Sep. 23, 2002

(65) Prior Publication Data

US 2003/0113664 A1      Jun. 19, 2003

(30) Foreign Application Priority Data

Sep. 27, 2001  (DE) ................. 101 47 723
May 28, 2002  (DE) ................. 102 23 648

(51) Int. Cl.
*C08F 20/10* (2006.01)
*C08F 20/44* (2006.01)
*G03H 1/04* (2006.01)

(52) U.S. Cl. ............... 430/2; 430/1; 430/945; 430/270.14; 430/19; 526/319; 526/341; 252/299.1; 252/299.01

(58) Field of Classification Search ........... 430/270.11, 430/270.14, 270.1; 252/299.01; 428/1.1
See application file for complete search history.

(56) References Cited

U.S. PATENT DOCUMENTS 4,631,328 A    12/1986   Ringsdorf et al. .......... 526/259

(Continued)

FOREIGN PATENT DOCUMENTS

DE       199 14 325       7/2000

(Continued)

OTHER PUBLICATIONS

Macromolecules, 5, Mar.-Apr. 1972, pp. 171-177, Chong Sook Paik and Herbert Morawetz, "Photochemical &Thermal Isomerization of Azoaromatic Residues in the Side Chains and the Backbone of Polymers in Bulk".

(Continued)

*Primary Examiner*—Martin Angebrannt
(74) *Attorney, Agent, or Firm*—Joseph C. Gil; Aron Preis

(57) ABSTRACT

Polymeric material suitable for the preparation of optical recording media for volume data storage is disclosed. The molecular structure of the material contains a main chain derived from any of poly(meth)acrylate, poly(meth)acrylamide, polysiloxane, polyurea, polyurethane, polyester, polystyrene and cellulose, and the side chains contain a) azobenzene dye, b) form anisotropic grouping, and c) at least one monomer selected from the group consisting of

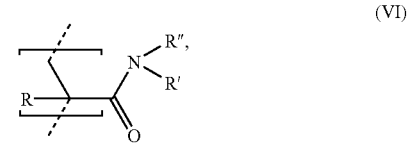

(VI)

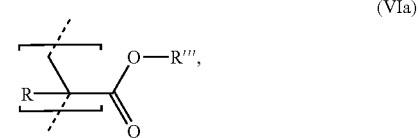

(VIa)

where R=H or methyl,
R' and R" independently denote CnH2n+1 or CnH2n-OH
and R'" denotes —CnH2N—OH.

5 Claims, 3 Drawing Sheets

U.S. PATENT DOCUMENTS

| | | | | |
|---|---|---|---|---|
| 5,098,975 | A | 3/1992 | Ornelis et al. | 526/312 |
| 5,483,005 | A | 1/1996 | Etzbach et al. | 525/328.2 |
| 5,543,267 | A | 8/1996 | Stumpe et al. | 430/290 |
| 5,738,806 | A | 4/1998 | Beckmann et al. | 252/582 |
| 6,046,290 | A | 4/2000 | Berneth et al. | 526/263 |
| 6,423,799 | B1 | 7/2002 | Berneth et al. | 526/218.1 |
| 2003/0096065 | A1* | 5/2003 | Berneth et al. | 428/1.1 |
| 2005/0094958 | A1* | 5/2005 | Dorn et al. | 385/129 |

FOREIGN PATENT DOCUMENTS

| | | |
|---|---|---|
| DE | 100 27 153 | 12/2001 |
| EP | 0 360 457 | 3/1990 |
| WO | 91/07449 | 5/1991 |
| WO | 91/09885 | 7/1991 |
| WO | 00/54111 | 9/2000 |
| WO | 00/54112 | 9/2000 |
| WO | 00/60586 | 10/2000 |

OTHER PUBLICATIONS

Makromol Chem., Rapid Commun. 8, (month unavailable), 1987, pp. 467-471, Manfred Eich, Joachim H. Wendorff, "Erasable holograms in polymeric liquid crystals".

Applied Optics, vol. 27, No. 16, Aug. 15, 1988, pp. 3368-3374, Jean J.A. Couture and Roger A. Lessard, "Modultion transfer function measurements for thin layers of azo dyes in PVA matrix used as an optical recording material".

Appl. Opt. 23, No. 23, Dec. 1984, pp. 4309-4312, T.Todorov, L. Nikolova & N. Tomova, "Polarization holography. 1: A new high-efficiency organic material with reversible photoinduced birefringence".

Macromolecules, 25, (month unavailable) 1992, pp. 2268-2273, A. Natansohn, P. Rochon, J. Gosselin, and S. Xie, "Azo Polymers for Reversible Optical Storage. 1. Poly[4'-[[2-(acryloyloxy)ethyl]]ethylamino]-4-nitroazobenzene]".

J. Opt. Soc. Am. B/vol. 7, No. 8, Aug. 1990, pp. 1428-1436, Manfred Eich and Joachim Wendorff, "Laser-induced gratings and spectroscopy in monodomains of liquid-crystalline polymers".

* cited by examiner

REWRITEABLE OPTICAL RECORDING MATERIAL HAVING GOOD SOLUBILITY

FIELD OF THE INVENTION

The present invention relates to an optical recording material for binary and/or multibit and/or volume data storage, and its production and use as storage material.

SUMMARY OF THE INVENTION

Polymeric material suitable for the preparation of optical recording media for binary and/or multibit and/or volume data storage is disclosed. The molecular structure of the material contains a main chain and side chains. The main chain is derived from any of polyacrylate, polymethacrylate, polyacrylamide, polymethacrylamide, polysiloxane, polyurea, polyurethane, polyester, polystyrene and cellulose, and the side chains contain a) azobenzene dye, b) form anisotropic grouping, and c) at least one monomer selected from the group consisting of

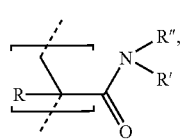

(VI)

wherein R' and R" independently of one another denote $C_nH_{2n+1}$ or $C_nH_{2n}$—OH, where n=1 to 10, or together denote a —$C_nH_{2n}$-bridge where n=2 to 6, a —$(C_2H_4$—$O)_n$—$C_2H_4$-bridge, where n=1 to 5, or a —$C_2H_4$—$N(C_nH_{2n+1})$—$C_2H_4$—bridge where n=1 to 6, and where R=H or methyl,

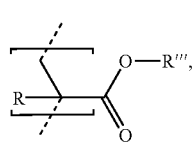

(VIa)

wherein R''' denotes the radical —$C_nH_{2n}$—OH where n=1 to 10, the radical —$(C_2H_4$—$O)_n$—H where n=2 to 4, or the radical —$C_nH_{2n}$—$C(=O)NR''''$ $R'''''$ where n=2 to 10, where R'''' and R''''' either independently of one another denote $C_nH_{2n+1}$ or $C_nH_{2n}$—OH, where n=1 to 10, or together denote a —$C_nH_{2n}$-bridge where n=2 to 6, a —$(C_2H_4$—$O)_n$—$C_2H_4$-bridge, where n=1 to 5, or a —$C_2H_4$—$N(C_nH_{2n+1})$—$C_2H_4$-bridge where n=1 to 6, and R=H or methyl.

BACKGROUND OF THE INVENTION

It has been known for a long time that azobenzenes undergo isomerization processes under the action of light [G. C. Hartley, Nature 140, 281 (1937)]. The isomeric states and the nature of the transition reactions between the cis and trans states have been investigated in various polymers that carry azobenzenes in dispersed form or as side chains or integrated into the main chains. [C. S. Paik; H. Morawetz, Macromolecules 5, 171 (1972)].

It is also known that azobenzenes incorporated into polymers exhibit a directed orientation in an actinic light field if they are exposed to polarized light of suitable wavelength. Exposure to linearly polarized light leads for example to an excess of azobenzenes oriented perpendicularly to the direction of polarization. This may be utilized to produce a light-induced double refraction in the polymer. The orientation mechanisms of the azobenzenes have been described many times in the literature. [M. Ecih; J. H. Wendorff; B. Reck; H. Ringsdorf; Makromol. Chem. Rapid Commun. 8, 59 (1987)] [Y. Q. Shen; H. Rau, Macromol. Chem. 192, 945 (1991)].

The possibility of employing such polymers for reversible optical data storage (digital or homographic) was described for the first time by Todorov. [T. Todorov; L. Nikolova; N. Tomova, Appl. Opt. 23, 4309 (1984)]. There are many various types of materials according to the prior art for binary and/or multibit and/or volume data storage that contain azobenzenes as antennae for the incident light; see for example patent specifications EP-A 1 171 877, EP-A 1 166 187, DE-A 10 027 153, EP-A 1 166 188 and DE-A 100 271 529. Several amorphous and liquid-crystal polymers as well as oligomers have been synthesized and investigated in light exposure experiments [J. J. A. Couture; R. A. Lessard, Appl. Opt. 27, 3368 (1988)] [M. Eich; J. Wendorff, J. Opt. Soc. Am. B, 7, 1428 (1990)] [A. Natansohn; P. Rochon; J. Gosselin; S. Xie; Macromolecules 25, 2268 (1992)].

The following three factors are the basis for high light-inducible double refraction values of such polymers:

1. A high form anisotropy of the molecular side groups.

Form anisotropic components are termed mesogenes. Mesogenes are typically rod shaped, due to a part of the moleclue that is elongated and rigid. The length-width ratio measured by the van-der-Waals radii must be at least 4, preferably between 4 and 6. The form anisotropy leads to an anisotropy of the molecular polarisability. This type of molecule is described in the standard literature [H. Kelker, R. Hatz, "Handbook of Liquid Crystals", Verlag Chemie (1980)] L. Bergmann; C. Schaefer, "Lehrbuch der Experimentalphysik", Verlag de Gruyter, Vol. 5, "Vielteilchensysteme" (1992)].

An azo dye present in the isomeric trans state also behaves as a mesogenic molecular unit if it satisfies the said condition for form anisotropy.

2. A high number density of form anisotropic molecules, i.e. a high azobenzene content and/or a high mesogene content in the polymer.

3. A strongly anisotropic molecular orientation distribution. This is the prerequisite for the molecular anisotropies (see point 1) to be manifested macroscopically.

The degree of anisotropy may be derived from the standardised linear absorption dichroism $A_2$, wherein $A_2=(2A_\perp+A_\parallel)/(3A_0)$, in which $A_\parallel$ and $A_\perp$ denote respectively the absorption of the polymer parallel and perpendicular to the polarization direction of the actinic light and $A_0$ denotes the absorption before the irradiation. The absorption may be determined by means of a spectrometer (e.g. Varian CARY 4G, UV-/VIS type spectrometer).

A more general description of the molecular orientation is provided by the order parameter $P_2=(A_\parallel-A_\perp)/(A_\parallel+2A_\perp)$, wherein $P_2=+1$ and $P_2=-0.5$ represent the limiting values for the perfect orientation of the molecular transition dipole moments parallel and perpendicular to the polarization direction of the light. $P_2=0$ denotes the isotropic case.

In particular side chain polymers, which in addition to azobenzenes also utilize form anisotropic components as side chains, are characterized by high light-inducible double refraction since they can satisfy the three prerequisites mentioned above.

In general it is true that polymers are the more sparingly soluble the better the points 1 and 2 mentioned above are satisfied, i.e., the higher the potential is for large double refraction values. Dipole forces, geometric forces and entropy forces are responsible for this on the microscopic scale.

Many solvents, for example, alcohols that are non-poisonous or are only slightly poisonous, are therefore not suitable as solvents. Good solvents for such polymers are however in many cases poisonous, carcinogenic and/or damaging to fruit. In many cases the volatility is also too high due to their low boiling point. An example is tetrahydrofuran (THF). It is described hereinafter why such solvents are disadvantageous for the production of data storage materials, which have to satisfy particularly stringent ecological demands during manufacture.

In order to be able to use polymers as a function layer in a data storage material, these must be prepared as homogeneous films. Several casting, droplet or coating processes may be used for the production of thin films. A standard process used in large-scale production, for example of recordable compact discs ("CD-R") and their successor formats is spin coating. In this the dyes are dissolved and the solution is dripped in an automated manner onto a rotating substrate (e.g. polycarbonate disc). After evaporation of the solvent a thin film of the recording material remains. In order to trap toxicologically problematic evaporated solvent so as to protect the environment, the production lines for data storage materials have had to be encapsulated by a complicated process, which is economically disadvantageous.

It should furthermore be noted that THF dissolves polycarbonate. An imprinted groove structure of a polycarbonate substrate would therefore be destroyed on contact with THF. In order to protect the groove structure a THF-resistant cover layer had to be applied to polycarbonate.

Reversible writing and erasing of double refraction values is a basic prerequisite for the use of a photo-addressable polymer as function layer in a rewriteable data storage material. The polymers described hitherto have the disadvantage that they do not sufficiently ensure the reversibility.

There was therefore a need for a recording material that exhibits light-inducible double refractions and that dissolves in one or more simple or modified alcohols that are non-poisonous or at least minimally poisonous. Furthermore, the recording medium should exhibit a good reversibility of the exposure dynamics.

It has surprisingly been shown that the recording materials listed in this application satisfy the aforementioned requirements.

DETAILED DESCRIPTION OF THE INVENTION

Figure 1:
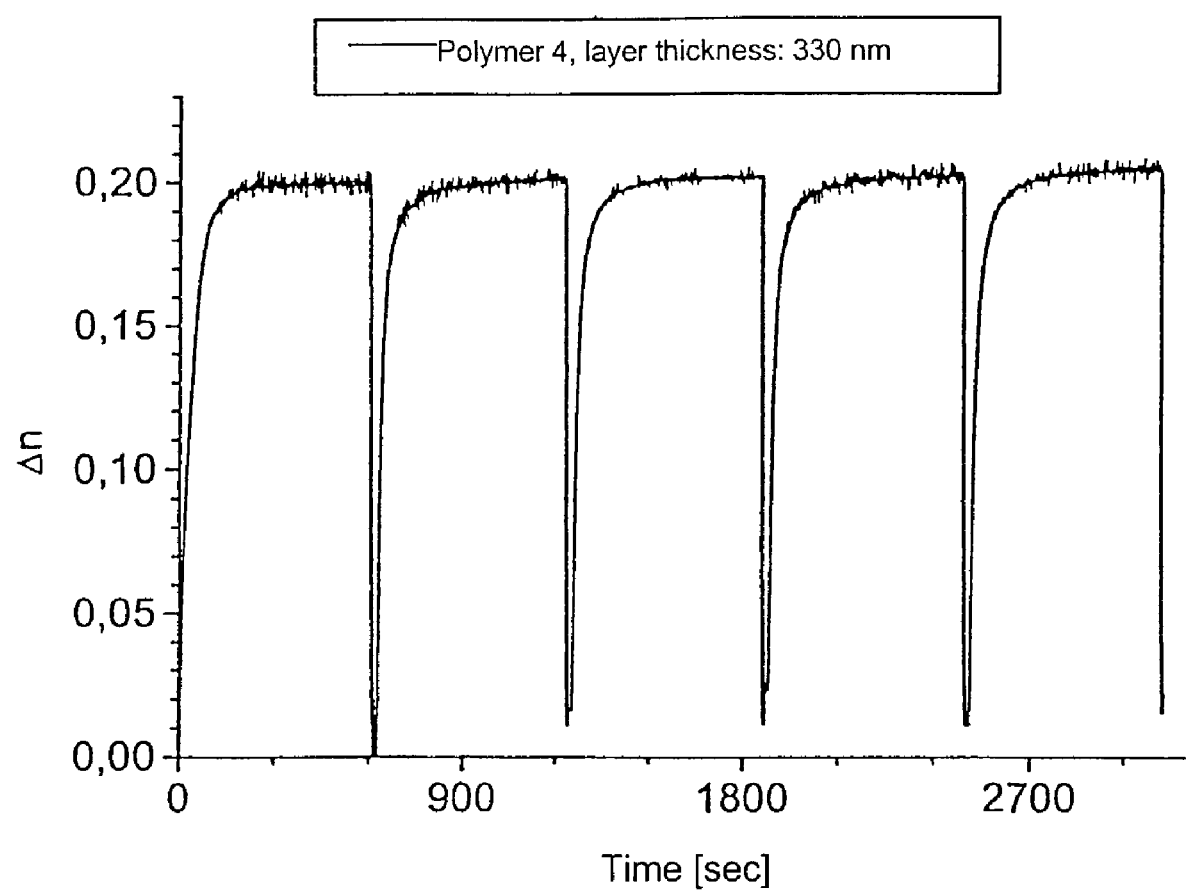
FIG. 1 shows the change in birefringence of a first polymer during five writing/extinction cycles. In the following text the term "double refraction" is used as a synonym for birefringence.

The present invention accordingly provides an optical recording material that may be used for binary and/or multibit and/or volume data storage. The recording material is characterized in that it contains at least one azobenzene dye ("azo dye"), and at least one form anisotropic grouping ("mesogene").

Provided the azo dye has this mesogenic character, it need not contain any further mesogene, it contains at least one molecular group that improves the solubility in one or more simple or modified alcohols, compared with the same material without this group, the monomers of the formulae (VI) or (VIa) or hydroxyethyl group-containing monomers, which are excellent for this purpose, being preferred, and it optionally contains a monomer unit, preferably of the formula (V), that is incorporated in the polymer specifically to reduce the dye content and/or mesogene content.

The recording material according to the invention is preferably a polymeric or oligomeric organic, amorphous material, particularly preferably a side chain-containing polymer.

The main chains of the side chain-containing polymer are derived from the following basic structures: polyacrylate, polymethacrylate, polyacrylamide, polymethacrylamide, polysiloxane, polyurea, polyurethane, polyester, polystyrene or cellulose. Polyacrylate, polymethacrylate and polyacrylamde are preferred.

The main chains may contain monomer building blocks that differ from these basic structures. These are monomer units according to the invention of the formula (VI).

The polymers according to the invention as a rule exist in an amorphous state below the clearing temperature.

The polymers and oligomers according to the invention preferably have glass transition temperatures $T_g$ of at least 40° C. The glass transition temperature may be determined for example according to B. Vollmer, Grundriss der Makromolekularen Chemie, pp. 406–410, Springer-Verlag, Heidelberg 1962.

The polymers and oligomers according to the invention have a weight average molecular weight of 5,000 to 2,000,000 g/mole, preferably 8,000 to 1,500,000 g/mole, determined by gel permeation chromatography (calibrated with polystyrene).

In the polymers that are preferably used according to the invention azo dyes, separated as a rule by flexible spacers, are covalently bonded as a side chain to the polymer main chain. The azo dyes interact with the electromagnetic radiation and thereby alter their spatial orientation, with the result that double refraction may be induced in the polymer under the action of light and may be re-extinguished.

The mesogenes are as a rule bonded in the same way as the azo dyes. They need not necessarily absorb the actinic light since they act as a passive molecular group. They are therefore not photoactive in the above sense. Their task is to intensify the light-inducible double refraction and stabilize it after the action of the light.

The molecular groups incorporated in order to improve the solubility of the polymer may be incorporated in three different ways:
1. As monomer units randomly integrated into the main chains. These monomer units are not functionalized with azobenzenes or mesogenes.
2. As a side group at the bonding site between the azobenzene and spacer.
3. As a terminal group at the free end of the azo dye.

The polymers according to the invention may at the same time contain azobenzenes that are modified according to the descriptions 2 and 3.

The polymers according to the invention may contain, apart from azobenzenes that have been modified according to the descriptions 2 and/or 3, also monomer units according to the description of point 1.

Azo dyes preferably have the following structure of the formula (I)

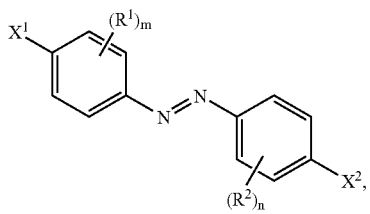

wherein
$R^1$ and $R^2$ independently of one another denote hydrogen or a non-ionic substituent and
m and n independently of one another denote an integer from 0 to 4, preferably 0 to 2.
$X^1$ and $X^2$ denote —$X^{1'}$—$R^3$ or $X^{2'}$—$R^4$,
wherein
$X^{1'}$ and $X^{2'}$ denote a direct bond, —O—, —S—, —(N—$R^5$)—, —C($R^6R^7$)—, —(C=O)—, —(CO—O)—, —(CO—$NR^5$)—, —($SO_2$)—, —($SO_2$—O)—, —($SO_2$—$NR^5$)—, —(C=$NR^8$)— or —($CNR^8$—$NR^5$)—,
$R^3$, $R^4$, $R^5$ and $R^8$ independently of one another denote hydrogen, $C_1$–$C_{20}$-alkyl, $C_3$–$C_{10}$-cycloalkyl, $C_2$–$C_{20}$-alkenyl, $C_6$–$C_{10}$-aryl, $C_1$–$C_{20}$-alkyl-(C=O)—, $C_3$–$C_{10}$-cycloalkyl-(C=O)—, $C_2$–$C_{20}$-alkenyl-(C=O)—, $C_6$–$C_{10}$-aryl-(C=O)—, $C_1$–$C_{20}$-alkyl-($SO_2$)—, $C_3$–$C_{10}$-cycloalkyl-($SO_2$)—, $C_2$–$C_{20}$-alkenyl-($SO_2$)— or $C_6$–$C_{10}$-aryl-($SO_2$)—, or
$X^{1'}$—$R^3$ and $X^{2'}$—$R^4$ may denote hydrogen, halogen, cyano, nitro, $CF_3$ or $CCl_3$,
$R^6$ and $R^7$ independently of one another denote hydrogen, halogen, $C_1$–$C_{20}$-alkyl, $C_1$–$C_{20}$-alkoxy, $C_3$–$C_{10}$-cycloalkyl, $C_2$–$C_{20}$-alkenyl or $C_6$–$C_{10}$-aryl.

Non-ionic substituents are understood to include halogen, cyano, nitro, $C_1$–$C_{20}$-alkyl, $C_1$–$C_{20}$-alkoxy, phenoxy, $C_3$–$C_{10}$-cycloalkyl, $C_2$–$C_{20}$-alkenyl or $C_6$–$C_{10}$-aryl, $C_1$–$C_{20}$-alkyl-(C=O)—, $C_6$–$C_{10}$-aryl-(C=O)—, $C_1$–$C_{20}$-alkyl-($SO_2$)—, $C_1$–$C_{20}$-alkyl-(C=O)—O—, $C_1$–$C_{20}$-alkyl-(C=O)—NH—, $C_6$–$C_{10}$-aryl-(C=O)—NH—, $C_1$–$C_{20}$-alkyl-O—(C=O)—, $C_1$–$C_{20}$-alkyl-NH—(C=O)— or $C_6$–$C_{10}$-aryl-NH—(C=O)—.

The alkyl, cycloalkyl, alkenyl and aryl radicals may in turn be substituted by up to three radicals from the group consisting of halogen, cyano, nitro, $C_1$–$C_{20}$-alkyl, $C_1$–$C_{20}$-alkoxy, $C_3$–$C_{10}$-cycloalkyl, $C_2$–$C_{20}$-alkenyl or $C_6$–$C_{10}$-aryl, and the alkyl and alkenyl radicals may be straight chain or branched.

Halogen is understood to denote fluorine, chlorine, bromine and iodine, in particular fluorine and chlorine.

Azo dyes that possess the solubility-improving properties within the meaning of the present invention are similarly covered by formula (I) including the abovementioned meanings, wherein however $R^5$ denotes $C_2$–$C_{10}$-alkyl-OH, preferably $C_2$–$C_4$-alkyl-OH, or denotes $CH_2$—(CH—OH)—$CH_2$—OH.

$X^1$ (or $X^2$) denote a spacer group, in particular in the meaning $X^{1'}$—($Q^1$)$_i$—$T^1$—$S^1$— wherein
$X^{1'}$ has the meaning given above,
$Q^1$ denotes —O—, —S—, —(N—$R^5$)—, —C($R^6R^7$)—, —(C=O)—, —(CO—O)—, —(CO—$NR^5$)—, —($SO_2$)—, —($SO_2$—O)—, —($SO_2$—$NR^5$)—, —(C=$NR^8$)—, —($CNR^8$—$NR^5$)—($CH_2$)$_p$—, p- or m-$C_6H_4$— or a divalent radical of the formulae

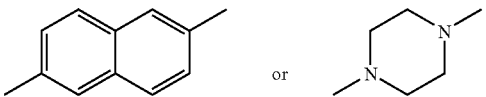

i denotes an integer from 0 to 4,
$T^1$ denotes —($CH_2$)$_p$—, wherein the chain may be interrupted by —O—, —$NR^9$—, or —$OSiR^{10}{}_2O$—,
$S^1$ denotes a direct bond, —O—, —S— or —$NR^9$—,
p denotes an integer from 2 to 12, preferably 2 to 8, in particular 2 to 4,
$R^9$ denotes hydrogen, methyl, ethyl or propyl,
$R^{10}$ denotes methyl or ethyl, and
$R^5$ to $R^8$ have the meanings given above.

The covalent bonding of monomers of the main chain basic structures described above with the azo dyes of the formula (I) via spacers yields dye monomers. Preferred dye monomers for polyacrylates or polymethacrylates have the formula (II)

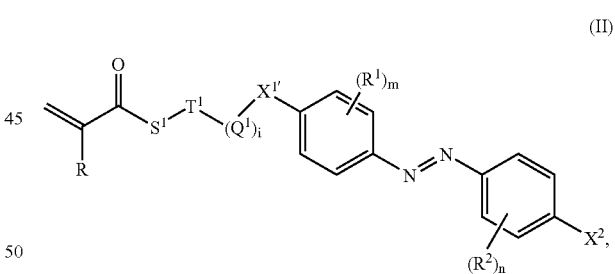

wherein
R denotes hydrogen or methyl and the other radicals have the meanings given above.

Particularly suitable are dye monomers of the above formula (II)

wherein
$X^2$ denotes CN, nitro and all other known electron-attracting substituents, and $R^1$ is preferably CN, and the radicals R, $S^1$, $T^1$, $Q^1$, $X^{1'}$, and $R^2$ as well as i, m and n have the meanings given above.

Also suitable are dye monomers of the following formula (IIa)

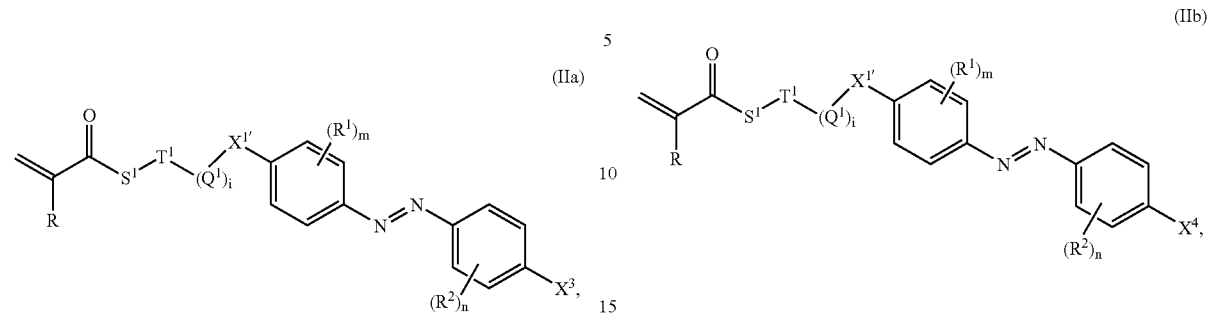

wherein $X^3$ denotes hydrogen, halogen or $C_1$–$C_4$-alkyl, preferably hydrogen, and the radicals R, $S^1$, $T^1$, $Q^1$, $X^{1'}$, $R^1$ and $R^2$ as well as i, m and n have the meanings given above.

Also suitable are dye monomers of the formula (IIb)

wherein $X^4$ denotes cyano or nitro, and the radicals R, $S^1$, $T^1$, $Q^1$, $X^{1'}$, $R^1$ and $R^2$ as well as i, m and n have the meanings given above.

Preferred monomer units with azo dyes that carry a solubility-improving component at the bonding site to the spacer and/or at the free position have the form:

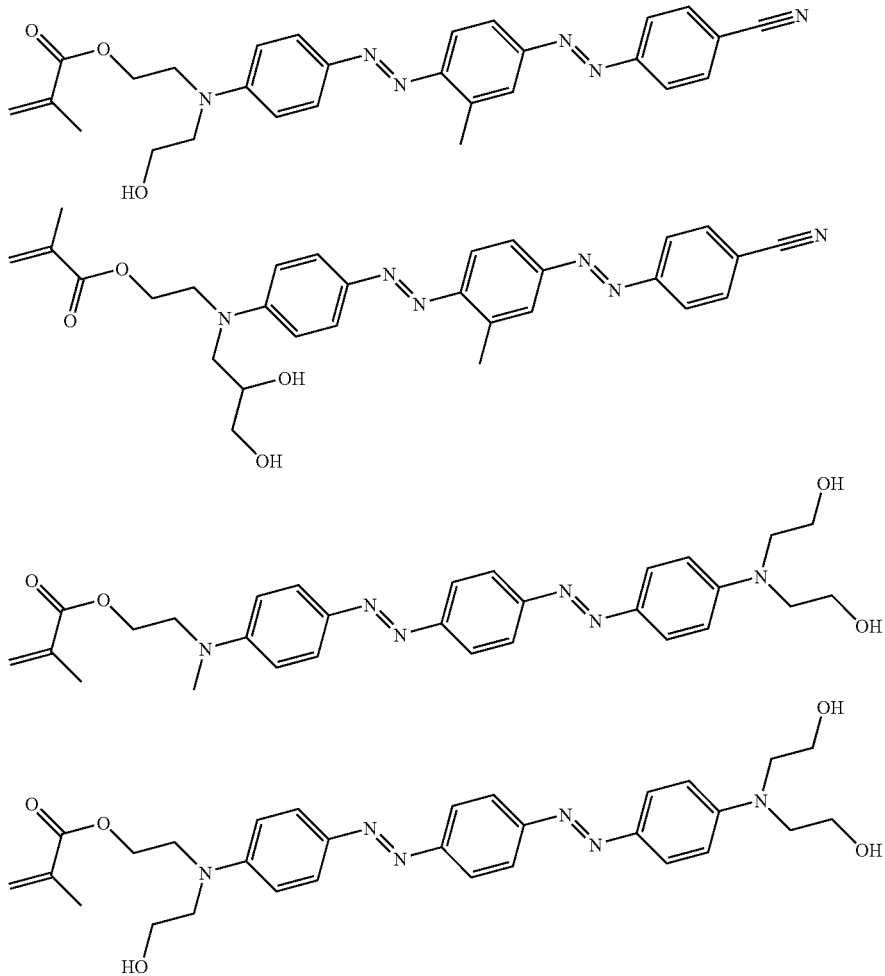

Mesogenic groups preferably have the structure of the formula (III)

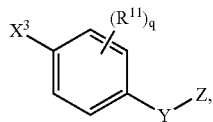
(III)

wherein
Z denotes a radical of the formulae

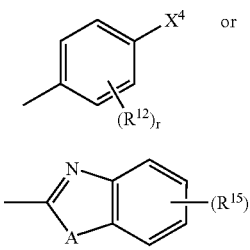
(IIIa)

(IIIb)

wherein
A denotes O, S or N—$C_1$–$C_4$-alkyl,
$X^3$ denotes a spacer group of the formula —$X^{3'}$—$(Q^2)_j$—$T^2$—$S^2$—,
$X^4$ denotes $X^{4'}$—$R^{13}$,
$X^{3'}$ and $X^{4'}$ independently of one another denote a direct bond, —O—, —S—, —(N—$R^5$)—, —C($R^6R^7$)—, —(C=O)—, —(CO—O)—, —(CO—$NR^5$)—, —($SO_2$)—, —($SO_2$—O)—, —($SO_2$—$NR^5$)—, —(C=$NR^8$)— or —(C$NR^8$—$NR^5$)—,
$R^5$, $R^8$ and $R^{13}$ independently of one another denote hydrogen, $C_1$–$C_{20}$-alkyl, $C_3$–$C_{10}$-cycloalkyl, $C_2$–$C_{20}$-alkenyl, $C_6$–$C_{10}$-aryl, $C_1$–$C_{20}$-alkyl-(C=O)—, $C_3$–$C_{10}$-cycloalkyl-(C=O)—, $C_2$–$C_{20}$-alkenyl-(C=O)—, $C_6$–$C_{10}$-aryl-(C=O)—, $C_1$–$C_{20}$-alkyl-($SO_2$)—, $C_3$–$C_{10}$-cycloalkyl-($SO_2$)—, $C_2$–$C_{20}$-alkenyl-($SO_2$)— or $C_6$–$C_{10}$-aryl-($SO_2$)—, or
$X^{4'}$—$R^{13}$ may denote hydrogen, halogen, cyano, nitro, $CF_3$ or $CCl_3$,
$R^6$ and $R^7$ independently of one another denote hydrogen, halogen, $C_1$–$C_{20}$-alkyl, $C_1$–$C_{20}$-alkoxy, $C_3$–$C_{10}$-cycloalkyl, $C_2$–$C_{20}$-alkenyl or $C_6$–$C_{10}$-aryl,
Y denotes a single bond, —COO—, OCO—, —CONH—, —NHCO—, —CON($CH_3$)—, —N($CH_3$)CO—, —O—, —NH— OR —N($CH_3$)—,
$R^{11}$, $R^{12}$, $R^{15}$ independently of one another denote hydrogen, halogen, cyano, nitro, $C_1$–$C_{20}$-alkyl, $C_1$–$C_{20}$-alkoxy, phenoxy, $C_3$–$C_{10}$-cycloalkyl, $C_2$–$C_{20}$-alkenyl or $C_6$–$C_{10}$-aryl, $C_1$–$C_{20}$-alkyl-(C=O)—, $C_6$–$C_{10}$-aryl-(C=O)—, $C_1$–$C_{20}$-alkyl-($SO_2$)—, $C_1$–$C_{20}$-alkyl-(C=O)—O—, $C_1$–$C_{20}$-alkyl-(C=O)—NH—, $C_6$–$C_{10}$-aryl-(C=O)—NH—, $C_1$–$C_{20}$-alkyl-O—(C=O)—, $C_1$–$C_{20}$-alkyl-NH—(C=O)— or $C_6$–$C_{10}$-aryl-NH—(C=O)—,
q, r and s independently of one another denote an integer from 0 to 4, preferably 0 to 2,
$Q^2$ denotes —O—, —S—, —(N—$R^5$)—, —C($R^6R^7$)—, —(C=O)—, —(CO—O)—, —(CO—$NR^5$)—, —($SO_2$)—, —($SO_2$—O)—, —($SO_2$—$NR^5$)—, —(C=$NR^8$)—, —(C$NR^8$—$NR^5$), —($CH_2$)$_p$—, p- or m-$C_6H_4$— or a divalent radical of the formulae

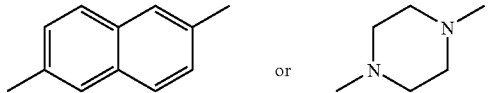

j denotes an integer from 0 to 4, wherein for j>1 the individual $Q^1$ may have various meanings,
$T^2$ denotes —($CH_2$)$_p$—, wherein the chain may be interrupted by —O—, —$NR^9$—, or —$OSiR^{10}_2O$—,
$S^2$ denotes a direct bond, —O—, —S— or —$NR^9$—,
p denotes an integer from 2 to 12, preferably 2 to 8, in particular 2 to 4,
$R^9$ denotes hydrogen, methyl, ethyl or propyl,
$R^{10}$ denotes methyl or ethyl.

Preferred monomers with such form anisotropic groupings for polyacrylates or polymethacrylates then have the formula (IV)

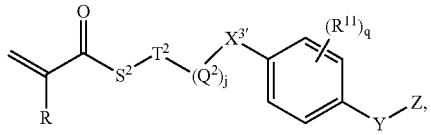
(IV)

wherein
R denotes hydrogen or methyl and
the other radicals have the meanings given above.

The alkyl, cycloalkyl, alkenyl and aryl radicals may in turn be substituted by up to three radicals from the group comprising halogen, cyano, nitro, $C_1$–$C_{20}$-alkyl, $C_1$–$C_{20}$-alkoxy, $C_3$–$C_{10}$-cycloalkyl, $C_{2-C20}$-alkenyl or $C_6$–$C_{10}$-aryl, and the alkyl and alkenyl radicals may be straight chain or branched.

Halogen is understood to denote fluorine, chlorine, bromine and iodine, in particular fluorine and chlorine.

In the following paragraph the term "functional building blocks" is used. Functional building blocks are monomer units which carry either an azo dye or a mesogenic unit. Both types of molecules are involved in the photoorientation process of a respective polymer, i.e. they are functional groups. The functional groups, or building blocks, must be distinguished from the "dilutive" block. These are monomers which cannot build up reorientable side chains. They just will be part of the polymer backbone, reducing the weight/number content of functional units.

In addition to these functional building blocks the polymers according to the invention may also contain building blocks that principally serve to reduce the percentage content of functional building blocks, in particular of dye building blocks. Apart from this task they may also be responsible for other properties of the polymers, such as, for example, the glass transition temperature, liquid crystallinity, film-forming property, etc.

For polyacrylates or polymethacrylates such monomers are acrylic acid esters or methacrylic acid esters of the formula (V)

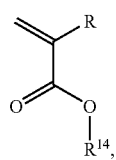
(V)

wherein
R denotes hydrogen or methyl and
$R^{14}$ denotes optionally branched $C_1$–$C_{20}$-alkyl or a radical containing at least one further acrylic unit.

Other copolymers may however also be incorporated.

The monomers units for improving the solubility have the following structure of the formulae (VI)–(VIa):

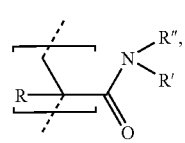
(VI)

in which
R' and R" either independently of one another denote $C_nH_{2n+1}$ or $C_nH_{2n}$—OH, where n=1 to 10, preferably n=1 to 3, or together denote a —$C_nH_{2n}$-bridge where n=2 to 6, preferably n=4 or 5, a —$(C_2H_4$—$O)_n$—$C_2H_4$-bridge, where n=1 to 5, preferably n=1 to 3, or a —$C_2H_4$—N$(C_nH_{2n+1})$—$C_2H_4$-bridge where n=1 to 6, preferably n=1 to 3,
where R=H or $CH_3$,

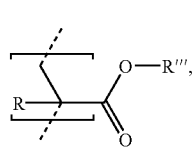
(VIa)

wherein
R''' denotes the radical —$C_nH_{2n}$—OH where n=1 to 10, preferably n=2 to 3, the radical —$(C_2H_4$—$O)_n$—H where n=2 to 4, preferably n=2, or the radical —$C_nH_{2n}$—C(=O)NR''''R'''''
where n=2 to 10, preferably n=2 to 5, particularly preferably n=2, where
R'''' and R''''' either independently of one another denote $C_nH_{2n+1}$ or $C_nH_{2n}$—OH, where n=1 to 10, preferably n=1 to 3, or together denote a —$C_nH_{2n}$-bridge where n=2 to 6, preferably n=4 or 5, a —$(C_2H_4$—$O)_n$—$C_2H_4$-bridge, where n=1 to 5, preferably n=1 to 3, or a —$C_2H_4$—N$(C_nH_{2n+1})$—$C_2H_4$-bridge where n=1 to 6, preferably n=1 to 3,
where R=H or $CH_3$.

Polyacrylates, polymethacrylates and poly(meth)acrylates/poly-(meth)-acrylamides according to the invention then preferably contain as repeating units those of the formula (VII), preferably those of the formulae (VII) and (VIII) or of the formulae (VII) and (IX), or those of the formulae (VII), (VIII) and (IX)

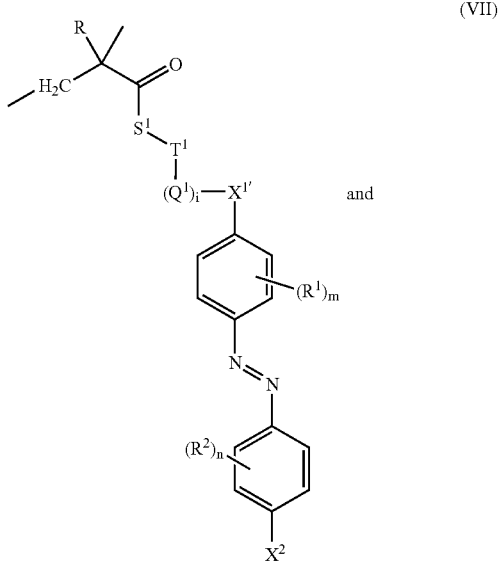
(VII)

and (VIII)

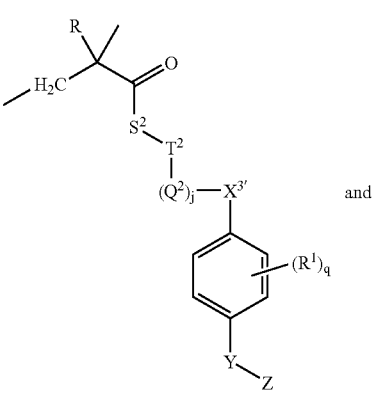
(IX)

or instead of the formula (VII) contain repeating units of the formulae (VIIa) or (VIIb)

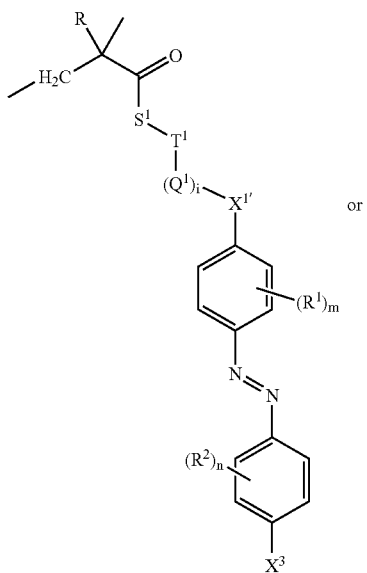
(VIIa)

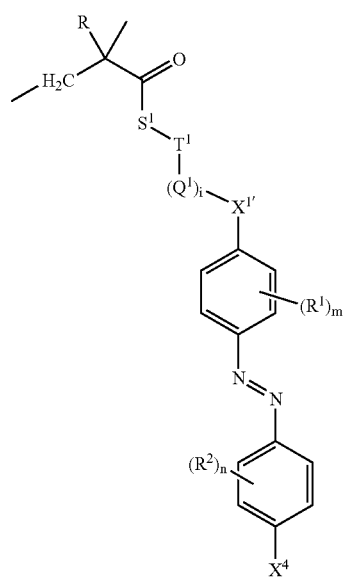
(VIIb)

wherein the radicals have the meanings given above. Several of the repeating units of the formula (VII) and/or of the repeating units of the formulae (VIII) and/or (IX) may also be present. Monomer units of the formula (V) may in addition also be present. Likewise, monomer units of the formula (VI) may in addition also be present.

The quantitative ratio between V, VI, VII, VII and IX is arbitrary. Preferably the concentration of VII is between 1 and 99% referred to the respective mixture. The ratio between VII and VII is between 1:99 and 99:1, preferably between 10:90 and 90:10, and most particularly preferably between 60:40 and 40:60. The proportion of V is 0 to 90%, preferably 20 to 80%, particularly preferably 30 to 70% referred to the respective mixture. The proportion of VI is 0 to 90%, preferably 20 to 80%, particularly preferably 30 to 70% referred to the respective mixture.

By means of the structure of the polymers and oligomers the intermolecular interactions of the structural elements of the formulae (VII) with one another or of the formulae (VII) and (VII) with one another are adjusted so that the formation of liquid crystal order states is suppressed and optically isotropic, transparent non-scattering films, sheets, panels or blocks, in particular films or coatings, can be produced. On the other hand the intermolecular interactions are still strong enough so that, under irradiation with light and/or under the action of static electrical fields, a photochemically induced, co-operative, aligned reorientation process of the light-active and non-light-active side groups is effected.

Preferably forces of interaction occur between the side groups of the repeating units of the formula (VII) and between those of the formulae (VII) and (VIII) that are sufficient so that the configuration change of the side groups of the formula (VII) effects an identically directed—so-called co-operative—reorientation of the other side groups ((VII) and/or (VIII)).

The production of the polymers and oligomers may be carried out according to processes known in the literature, for example according to DD-A 276 297, DE-A 3 808 430, Makromolekulare Chemie 187, 1327–1334 (1984), SU-A 887 574, Europ. Polym. 18, 561 (1982) and Liq. Cryst. 2, 195 (1987).

A further method of producing the recording material or the polymer according to the invention includes a process wherein at least one monomer is polymerized, preferably free-radical polymerized, without additional solvent, the polymerization being initiated particularly preferably by free-radical starters and/or UV light and/or thermally.

The polymerization is carried out at temperatures between 20° C. and 200° C., preferably between 40° C. and 150° C., particularly preferably 50° C. and 100° C. and most particularly preferably around 60° C.

In a preferred embodiment AIBN (azoisobutyronitrile) is used as free-radical starter.

The co-use of a further, preferably liquid monomer has often proved convenient. Such monomers are understood to include monomers, preferably olefinically unsaturated monomers, particularly preferably based on acrylic acid and methacrylic acid, and most particularly preferably methyl methacrylate, that are liquid at the reaction temperatures.

EXAMPLES

Example 1

Synthesis of Monomers

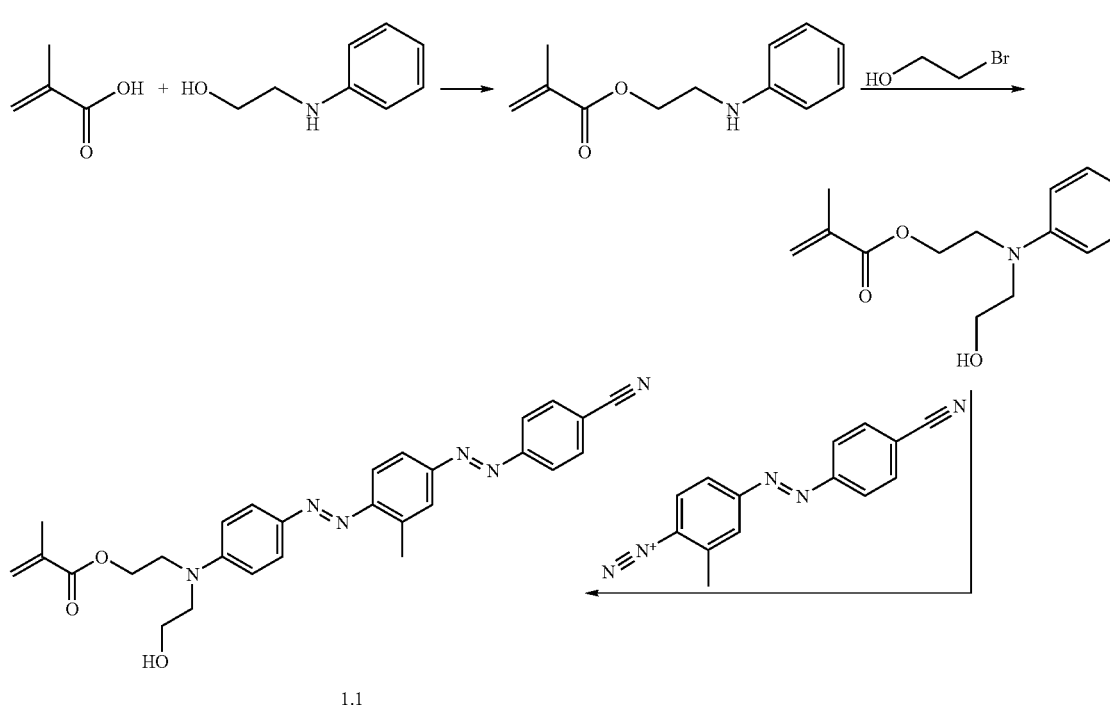

1.1

200 g of 2-anilinoethanol, 580 ml of methacrylic acid and 115.6 g of hydroquinone and 880 ml of chloroform are refluxed while stirring. 148 ml of conc. sulfuric acid are slowly added dropwise. The reaction water is removed azeotropically. After cooling, water is added to the reaction mixture and the pH is adjusted to 6 with conc. aqueous soda solution. The organic phase is separated and the solvent is removed via a rotary evaporator. The product is purified chromatographically (silica gel; methylene chloride). The yield of N-[2-(methacryloyloxy)ethyl]aniline is 112 g (34% of theory).

30 g of 2-bromoethanol are added at 70° C. to a reaction vessel under an argon atmosphere. 30 g of N-[2-(methacryloyloxy)ethyl]aniline are slowly added. The reaction mixture is then stirred for 24 hours at 100° C., and after cooling is added to chloroform and washed with water. After drying the reaction product with magnesium sulfate the chloroform is removed and the product is purified chromatographically (aluminium oxide; dioxane). The yield of N-(hydroxyethyl)-N-[2-(methacryloyloxy)ethyl]aniline is 10.2 g (28%).

Elementary analysis: $C_{14}H_{19}NO_3$ (249.31) Calc.: C67.45; H7.68; N5.62; Found: C67.30; H7.40; N5.60.

5.7 g of 4-amino-3-methyl-4'-cyanoazobenzene are added to a mixture of 40 ml of acetic acid and 13 ml of hydrochloric acid at 5° C., diazotised by slowly adding 8.6 g of 30% sodium nitrite solution, and coupled with 6 g of N-(hydroxyethyl)-N-[2-(methacryloyloxy)ethyl]aniline in 200 ml of methanol at 15° C. The pH of 2.0–2.5 is maintained by adding sodium acetate. The precipitate is stirred for 1 hour, filtered off, washed with water and methanol, dried, and filtered in dioxane through a layer of aluminium oxide. The yield of 1.1 is 6.2 g. M.p. 148° C.

Elementary analysis: $C_{28}H_{28}N_6O_3$ (496.57) Calc.: C67.73; H5.68; N16.92; Found: C67.80; H5.70; N16.70.

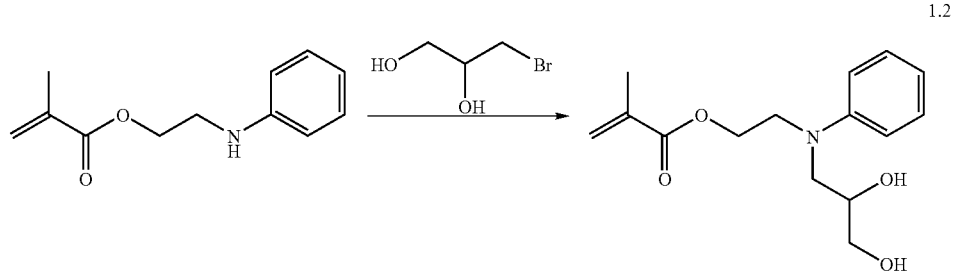

1.2

-continued

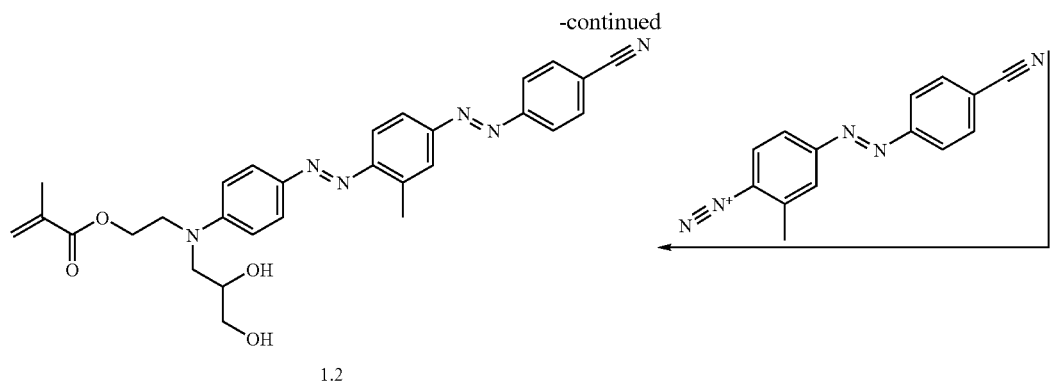

1.2

N-(2,3-dihydroxypropyl)-N-[2-(methacryloyloxy)ethyl] aniline is produced in a similar manner to 1.1 from 3-bromo-1,2-propanediol and N-[2-(methacryloyloxy)ethyl]aniline. The product is purified chromato-graphically (aluminium oxide; firstly toluene/dioxane=1:1, then dioxane). The yield is 28%.

The monomer 1.2 is produced similarly to 1.1 by diazotisation of 4-amino-3-methyl-4-cyanoazobenzene and coupling with N-(2,3-dihydroxypropyl)-N-[2-(methacryloyloxy)ethyl]aniline. Chromatographic purification is carried out on silica gel on toluene/dioxane=1:1. The yield is 30%. M.p. 148° C.

10.7 g of 2,2'-[4-(4-aminophenylazo)phenylimino]diethanol are added to a mixture of 60 ml of water and 20 ml of hydrochloric acid at 5° C., diazotised by slowly adding 12.8 g of 30% sodium nitrite solution, and coupled at 15° C. with 10 g of N-methyl-N-[2-(methacryloyloxy)ethyl]aniline in 300 ml of methanol. The pH of 2.7 is maintained by adding sodium acetate. The precipitate is stirred for 1 hour, filtered off, washed with water, dried, and recrystallized from xylene. The yield of 1.3 is 7.2 g. M.p. 149° C.

Elementary analysis: $C_{29}H_{34}N_6O_4$ (530.63) Calc.: C65.64; H6.46; N15.84; Found: C65.70; H6.40; N15.70.

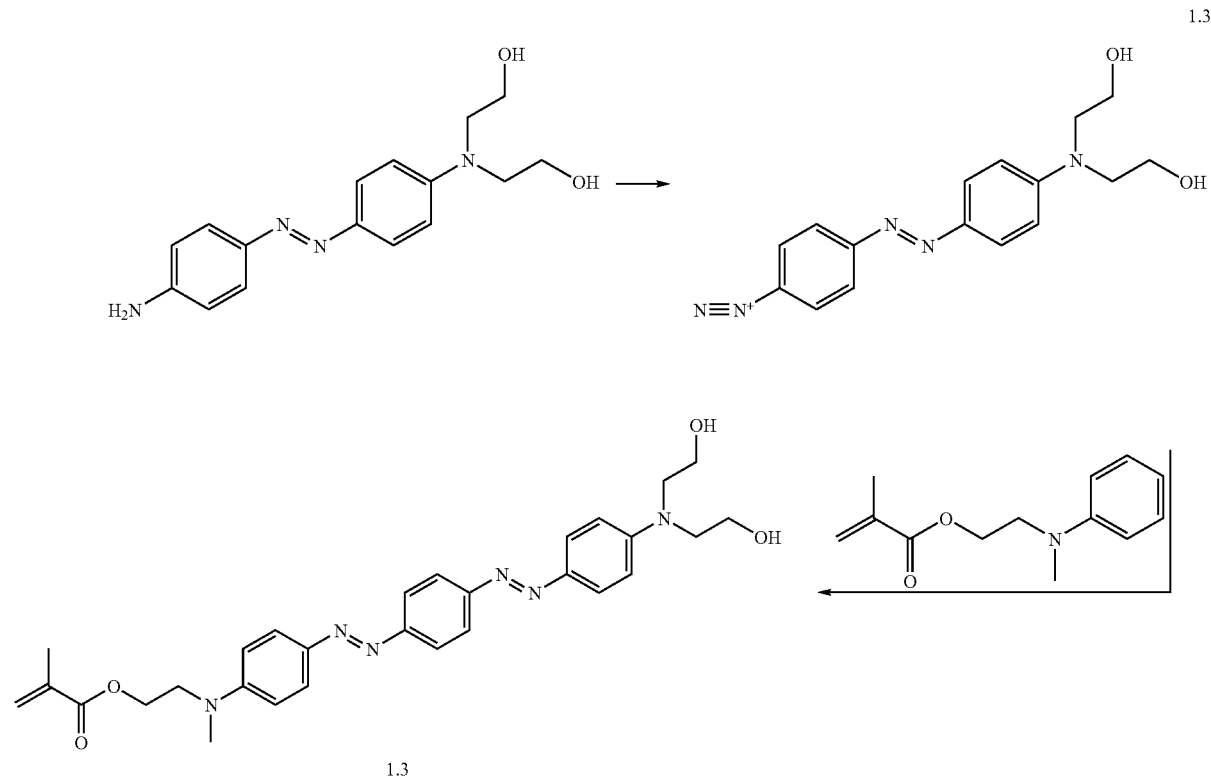

1.3

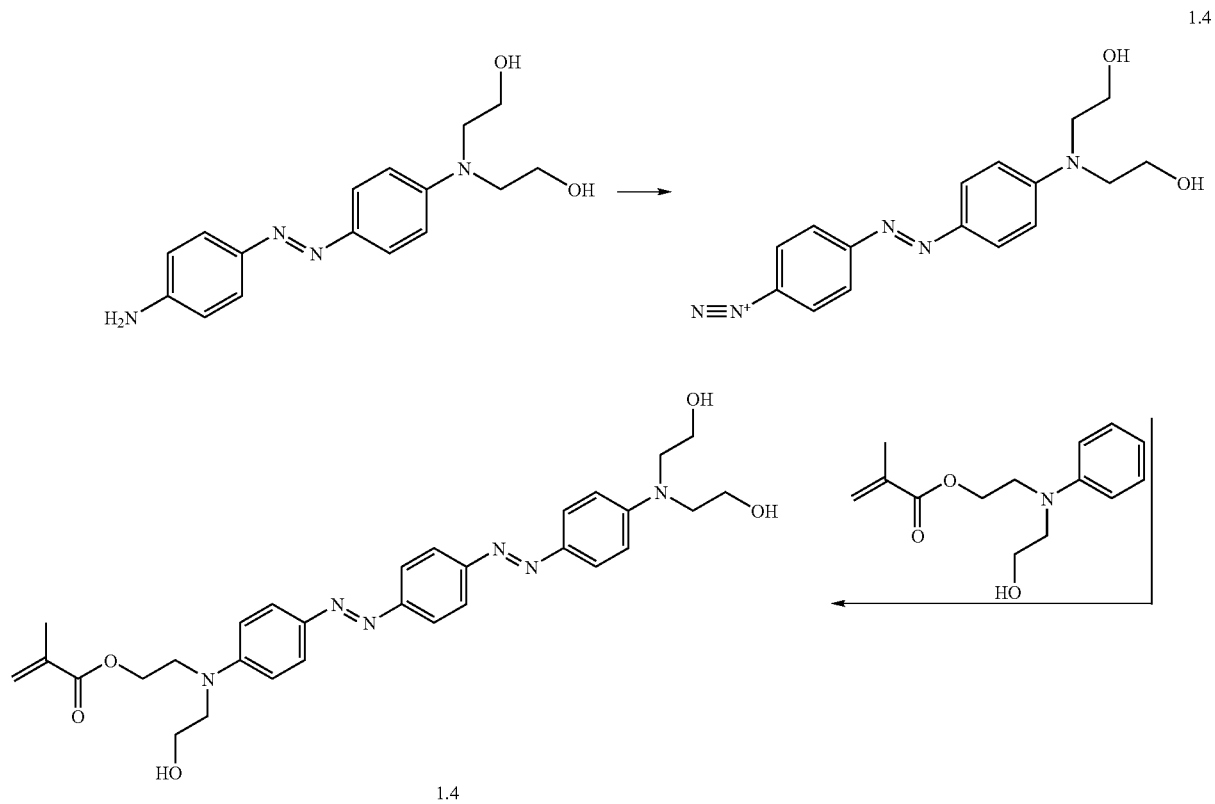

1.4

12.8 g of 2,2'-[4-(4-aminophenylazo)phenylimino]diethanol are added to a mixture of 60 ml of water and 20 ml of hydrochloric acid at 5° C., diazotised by slowly adding 15.2 g of 30% sodium nitrite solution, and coupled at 15° C. with 10.6 g of N-(hydroxyethyl)-N-[2-(methacryloyloxy)ethyl] aniline in 300 ml of methanol. The pH of 2.7 is maintained by adding sodium acetate. The precipitate is stirred for 1 hour, filtered off, washed with water, dried, and recrystallized from xylene. The yield of 1.4 is 15 g. M.p. 105° C.

Elementary analysis: $C_{30}H_{36}N_6O_5$ (560.66) Calc.: C64.27; H6.47; N14.99; Found: C64.10; H6.40; N14.20.

Example 2a

Improvement of the Solubility by the Incorporation of Dimethylacrylamide

Copolymers according to the invention having the following structure are described hereinafter:

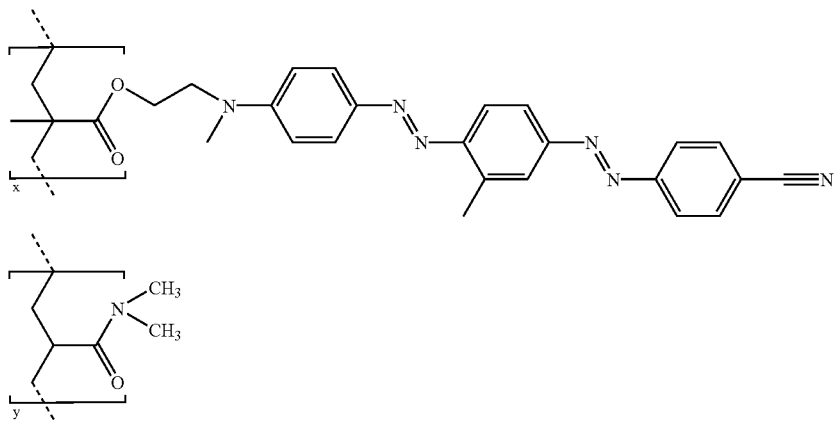

The x-monomer is functionalized with an azobenzene dye molecule. The y-monomer consists of dimethylacrylamide (DMAA).

Five copolymers were prepared that differ as regards the monomer ratio x:y (see following table; identification of the polymers by consecutive numbers 1 to 5). The copolymers are compared with the homopolymer (x=100%; identification: polymer 6).

The molecular weights of the polymers were determined by means of gel permeation chromatography (GPC). The GPC was carried out using N,N-dimethylacetamide (DMAC) as solvent. The evaluation of the signals was carried out on the basis of a calibration relationship valid for PMMA at 60° C. in DMAC. The values for the weight average molecular weight were in the range 10500 to 13300 g/mole. The values for the number average molecular weight were between 5500 and 6810 g/mole.

The glass transition temperatures were determined by means of heat flow calorimetry. Equipment: DSC-2 calorimeter from Perkin-Elmer. Two heating runs were carried out from room temperature up to 300° C. at a heating rate of 20 K/min. Between the heating runs the samples were cooled rapidly at a rate of 320 K/min to room temperature, in each case flushing with nitrogen (30 ml/min). The glass transition temperatures of the polymers 1 to 6 for the second heating run were between 92° and 104° C.

The solubility of the polymers was tested in various simple and modified alcohols. The results are shown in the following table: "+" denotes the suitable solvents, "(+)" denotes not completely soluble, and "−" denotes the unsuitable solvents. A 2% solution of the polymer was used. The following solvents were investigated: methanol, ethanol, butanol, 4-hydroxy-4-methyl-2-pentanone (HMP), 2,2,3,3-tetrafluoropropanol (TFP) and tetrahydrofuran (THF).

|   | Polymer 1 | Polymer 2 | Polymer 3 | Polymer 4 | Polymer 5 | Polymer 6 |
| --- | --- | --- | --- | --- | --- | --- |
| Fraction x [mole %] | 10 | 20 | 30 | 45 | 50 | 100 |
| Fraction y [mole %] | 90 | 80 | 70 | 55 | 50 | 0 |
| Methanol, ethanol, butanol | + | − | − | − | − | − |
| HMP | + | + | − | − | − | − |
| TFP | + | + | + | + | (+) | − |
| THF | + | + | + | + | + | + |

Surprisingly, a significant improvement in the solubility in TFP was achieved by the incorporation of DMAA; see polymer 6 compared to the polymers 1 to 5. For the latter polymers, TFP is a suitable solvent. These polymers contain at least 50 mole % or at least 18 wt. % of DMAA.

Example 2b

Comparison Example not According to the Invention

Copolymers having the following structure are described hereinafter:

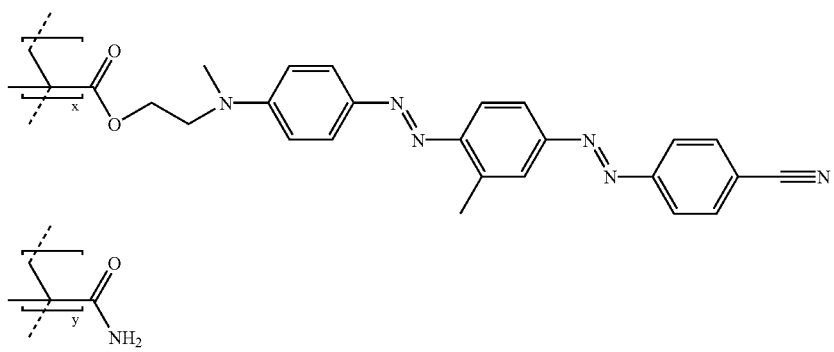

The monomer unit x corresponds to polymer 6 (see Example 2a). The unit is contained in an amount of 20, 30, 40 and 50 mole %. The polymers in this sequence are identified as polymers 2b, 3b, 4b and 5b. The monomer unit y consists of acrylamide.

The solubility of the polymers in 2,2,3,3-tetrafluoropropanol (TFP) was tested (20% solution) similarly to Example 2a. The results are summarised in the following table:

|   | Polymer 2b | Polymer 3b | Polymer 4b | Polymer 5b | Polymer 6b |
| --- | --- | --- | --- | --- | --- |
| Fraction x [mole %] | 20 | 30 | 40 | 50 | 100 |
| Fraction y [mole %] | 80 | 70 | 60 | 50 | 0 |
| TFP | + | − | − | − | − |

The solubility-improving action of the monomer unit y is slight. At least 80 mole % of the monomer unit y must be contained in the polymer for the latter completely to dissolve in TFP. With the polymer according to the invention on the other hand, (see Example 2a) only 50 mole % of dimethylacrylamide (DNAA) is necessary to achieve the same effect.

Example 3

Improvement of the Solubility by Using Dye Molecules Containing Hydroxyethyl Groups Polymers were produced containing azobenzene dyes as side chains, which are responsible for the solubility-improving action according to the invention. The solubility-improving hydroxyethyl groups are attached at the bonding site to the spacer and/or at the free position of each azobenzene dye.

The polymers produced are numbered consecutively 7 to 10: Polymer 7:
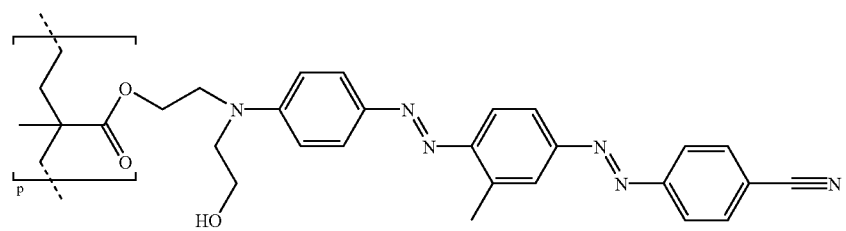
(Monomer from Example 1.1)
Polymer 8:
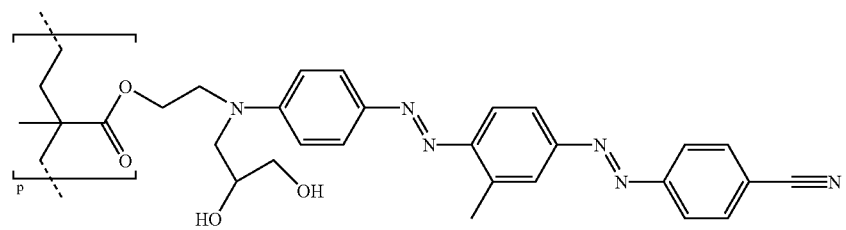
(Monomer from Example 1.2)
Polymer 9:
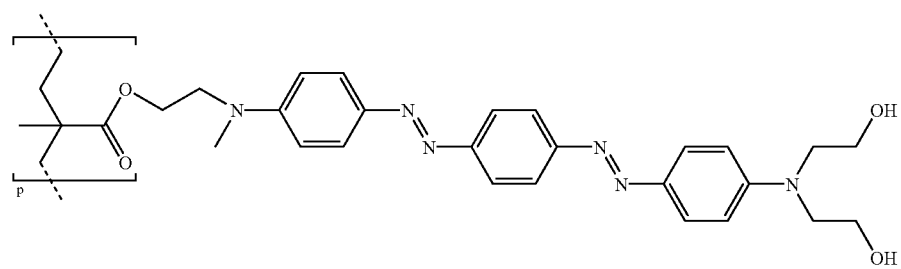
(Monomer from Example 1.3)
Polymer 10:
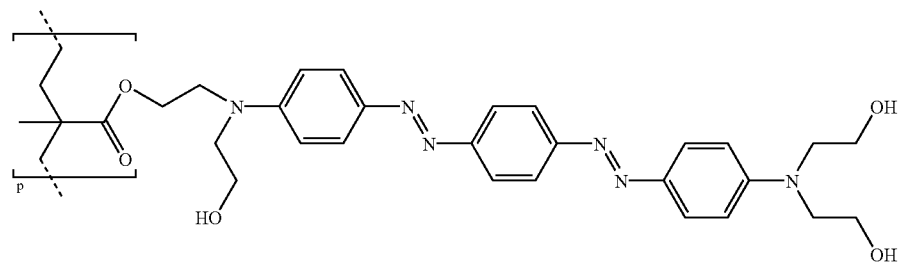
(Monomer from Example 1.4)

These polymers are compared with polymer 6 (see Example 2). The result is as follows: the polymers 7 to 10 can dissolve not only (like polymer 6) in THF, but in contrast to the latter also in HMP (2% concentration). The larger the proportion of OH groups in the polymer, the greater the forces of interaction with the hydroxy groups of the solvent HMP, and the better can HMP act as a solvent. The details are as follows: polymer 7 dissolves incompletely in HMP, polymers 8 and 9 dissolve almost completely, and polymer 10 dissolves extremely well in HMP.

Example 4

Magnitude of the Light-induced Double Refraction Values

Several polymers according to the invention were produced which, as a thin film, exhibit high light-inducible double refraction values. The polymers 1 to 5 according to the invention (see Example 2) and 7 to 10 (see Example 3) were investigated in illumination experiments. The magnitude of the light-induced double refraction values of originally isotropic polymer films was measured.

Description of the Film Preparation:

A 1 mm thick glass substrate is provided with a thin polymer film. The film is applied by means of the spin coating technique. For this, the polymer at a typical concentration of 20 to 75 g/l is dissolved in a suitable alcohol and the polymer solution is applied dropwise to the substrate rotating at a rotational speed of 2000 m$^{-1}$. The polymer film that is formed typically has a thickness of 200 nm. Solvent residues are removed from the film by heating the coated glass support for 2 hours at 60° C. in a vacuum oven.

Description of the Illumination Experiments:

Each sample prepared as described above is irradiated from the polymer side with polarized laser light incident perpendicular thereto (writing process). An argon ion laser (from Continuum) at a wavelength of 514 nm serves as light source. The intensity of this so-called writing laser is 100 mW/cm$^2$. Trans-cis-trans-isomerization cycles are induced in the azobenzene side group molecules of the polymer, leading to a net orientation of the side groups away from the polarization direction of the laser. These molecular dynamics are manifested macroscopically in a double refraction $\Delta n$ in the plane of the polymer film. The dynamics under the given lighting parameters occur in the order of minutes.

The chronological behavior of the induced double refraction at a wavelength of 633 nm is determined experimentally with a helium-neon laser (typical intensity: 10 mW/cm$^2$). The light of this so-called reading laser incident on the polymer layer forms a solid angle of 15° relative to the perpendicular to the layer. The reading light and writing light overlap on the polymer layer. The direction of polarization of the reading light forms in the plane of the polymer film an angle of 45° relative to the polarization of the writing light. It is rotated on passing through the polymer layer as long as the layer is double-refracting. This rotation is accompanied by an increase in the reading light intensity $I_s$ after an analyzer that is situated in the beam path after the sample and allows light perpendicular to the original polarization direction to pass. The intensity $I_p$ decreases to the same extent as $I_s$ increases. $I_p$ is defined as the transmitted intensity after a similarly positioned analyser, but which selects the original polarization direction of the reading laser. Experimentally the two components of the polarization direction parallel and perpendicular to the original direction are separated by a polarising beam splitter and are detected with the aid of two Si photodiodes. The double refraction $\Delta n$ is calculated from the measured intensities by means of the following equation:

$$\Delta n = \frac{\lambda}{\pi d} \arcsin \sqrt{\frac{I_s}{I_s + I_p}}$$

where d denotes the thickness of the polymer layer and $\lambda=633$ nm denotes the light wavelength of the reading laser. In this formula it is assumed by way of approximation that reading takes place perpendicular to the polymer layer.

The polymers have the following double refraction values: polymer 1: $\Delta n=0.06$; polymer 2: $\Delta n=0.11$; polymer 3: $\Delta n=0.17$; polymer 4: $\Delta n=0.20$; polymer 5: $\Delta n=0.21$; polymer 6: $\Delta n=0.44$; polymer 7: $\Delta n=0.39$; polymer 8: $\Delta n=0.10$; polymer 9: $\Delta n=0.23$; polymer 10: $\Delta n=0.12$.

Example 5

Improvement of the Reversibility of the Light-induced Molecular Dynamics by Incorporation of Dimethylacrylamide Films of the polymers 1 to 5 according to the invention described in Example 2a were produced according to the protocol of Example 4, illuminated for 10 minutes, and the double refraction structure was investigated with a reading laser. The double refraction $\Delta n$ reaches its maximum value within the illumination time and maintains this value. $\Delta n$ is then extinguished by rotating the polarization direction of the writing light by 90°. This extinction process is complete as soon as $\Delta n=0$. This first procedure is then directly followed by four further writing/extinction procedures according to the same pattern. The result is as follows: the time curve $\Delta n(t)$ remains almost unchanged for each cycle. The maximum achievable double refraction values are identical for each cycle (permitted tolerance: 5%). The behavior of the polymers 1 to 5 may to a good approximation be classed as reversible in these writing/extinction cycles.

FIG. 1 shows by way of example the double refraction curve of polymer 4 during the five writing/extinction cycles.

The comparable experiment was already carried out beforehand with polymer 6, which does not contain the solubility-improving monomer unit according to the invention. Since the double refraction $\Delta n$ had still not reached its maximum after 10 minutes' illumination, the illumination time of the five writing procedures was extended to 30 minutes. It should be noted that the shape of the double refraction curves changes with each new cycle. In particular, the maximum achievable double refraction value decreases with increasing cycle number. After the end of the fifth writing procedure the double refraction is now only 33% of the value reached in the first writing procedure (see also the table hereinbelow).

Figure 2:
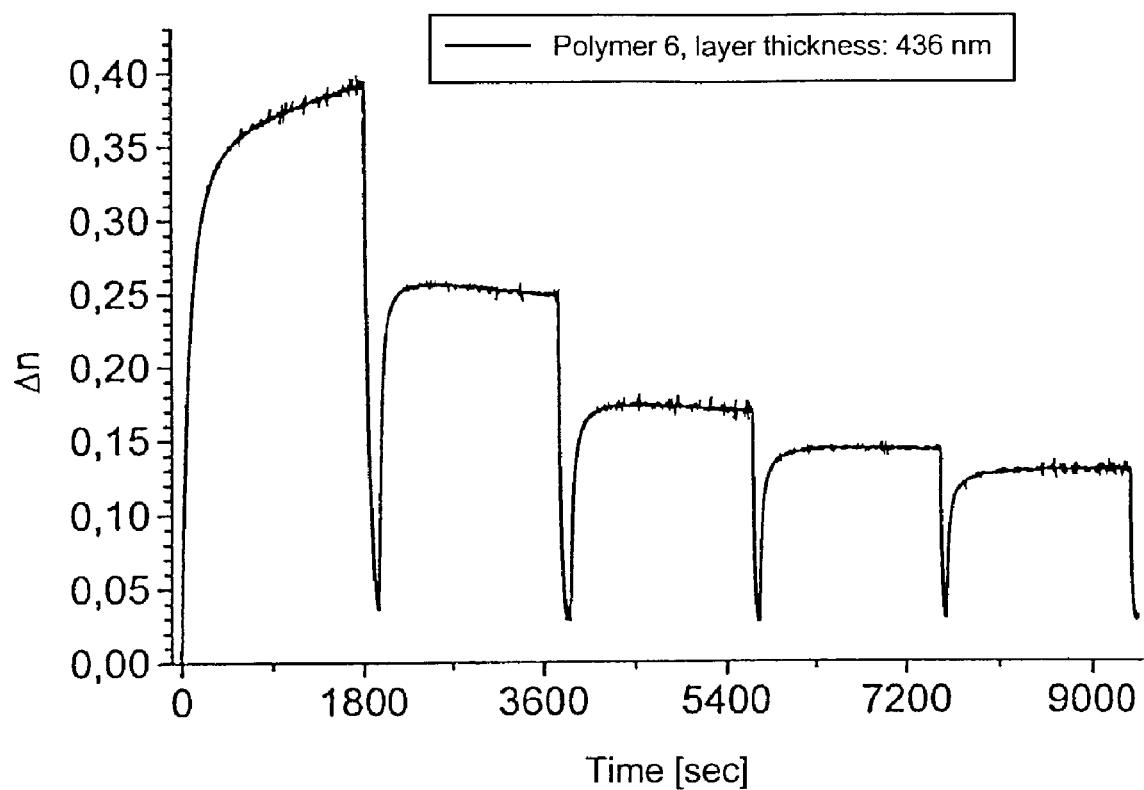
FIG. 2 shows the change in the double refraction of a second polymer during five writing/extinction cycles.

FIG. 2 shows the double refraction curve of polymer 6 during the five writing/extinction cycles.

In order to ensure that the longer illumination time compared to the polymers 1 to 5 does not qualitatively falsify the result, writing/extinction cycles were carried out on polymer 6 with in each case a writing time of only 100 sec. The double refraction curves do not reach their maximum value with this short writing time. The results are as follows: these cycles too do not behave reversibly, i.e. the value reached after 100 sec. is after the fifth cycle only 71% of the value reached in the first cycle.

Figure 3:
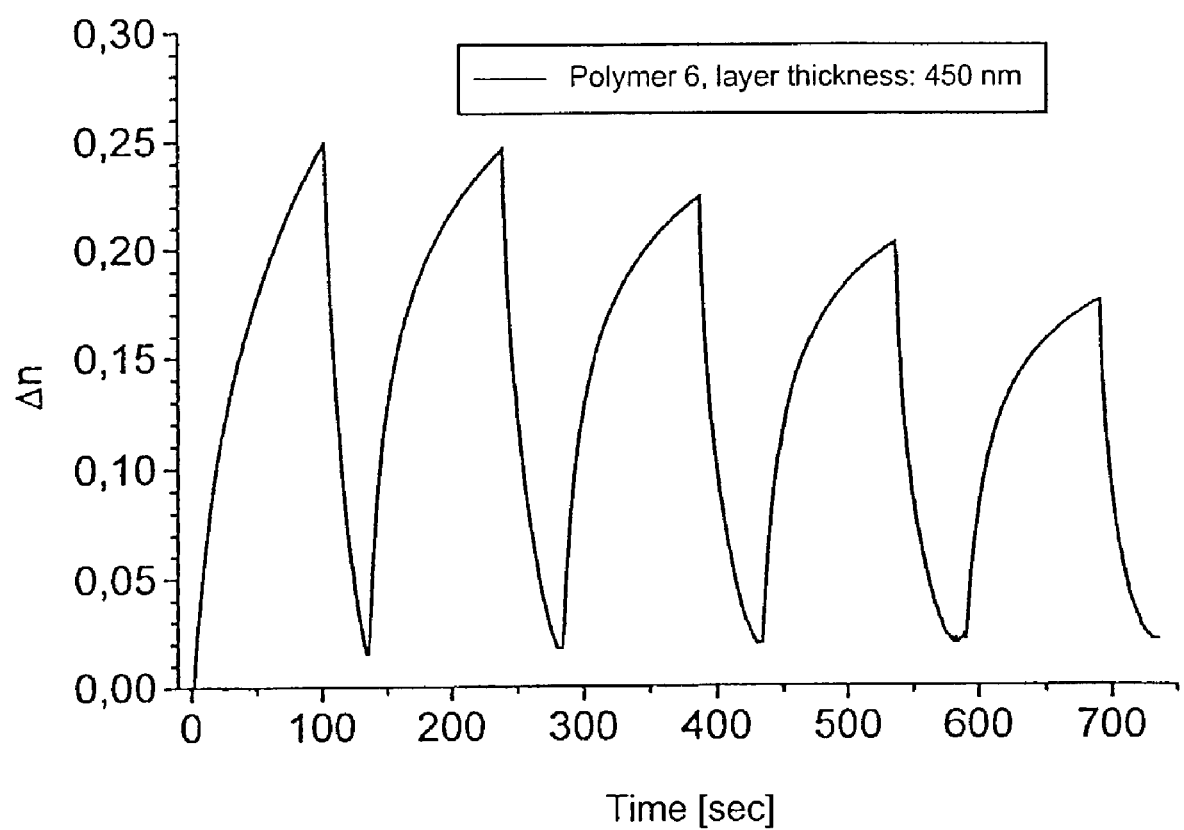
FIG. 3 shows the change in the double refraction of the second polymer during five writing/extinction cycles conducted at a short time period.

FIG. 3 shows the double refraction curve relating to this experiment.

Summary of the Results:

| | Polymer 1 | Polymer 2 | Polymer 3 | Polymer 4 | Polymer 5 | Polymer 6 |
|---|---|---|---|---|---|---|
| Fraction x [mole %] | 10 | 20 | 30 | 45 | 50 | 100 |
| Fraction y [mole %] | 90 | 80 | 70 | 55 | 50 | 0 |
| Double refraction value after 5 cycles [%] * | 100 | 100 | 100 | 100 | 100 | 33/71 ** |

* Value relative to the double refraction of the first cycle
** 1800 sec/100 sec writing time Due to the incorporation of dimethacrylamide monomer units in an amount of at least 50 mole % (see fraction y in the above table), not only was the solubility of the polymer in TFP achieved, but also the reversibility of the lighting dynamics was significantly improved. Reversible writing and extinction of double refraction values is a basic prerequisite for the use of a photoaddressable polymer as function layer in a rewriteable data storage material.

Example 6

Suitability of the Polymers for Blue Writing Lasers

The example of polymer 4 shows that not only is a green writing laser suitable (Examples 4 and 5), but for example a blue writing laser too is suitable. A laser illumination was performed according to the principle outlined in Example 4. The writing laser had a light wavelength of 407 nm and an intensity of 100 mW/cm². The results are as follows: a maximum double refraction value of Δn=0.2 could likewise be induced (measurement error ca. 10%).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymeric material the molecular structure of which contains main chains and side chains, the main chain including units derived a member selected from the group consisting of polyacrylate, polymethacrylate, polyacrylamide, polymethacrylamide, polysiloxane, polyurea, polyurethane, polyester, polystyrene and cellulose, and the side chains containing a) at least one azobenzene dye-containing monomer selected from the group consisting of

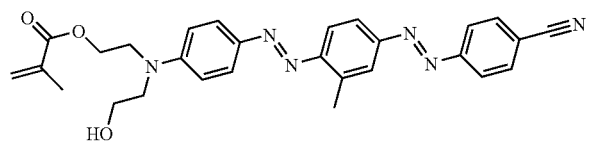
(X)

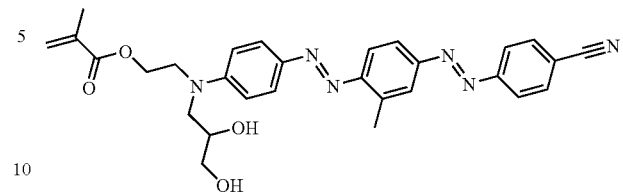
(XI)

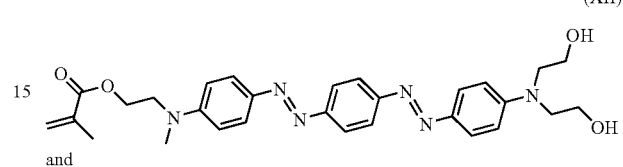
(XII)

and

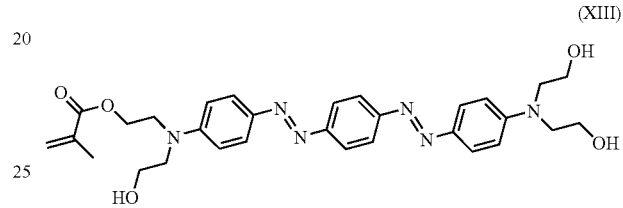
(XIII)

or an azobenzene dye conforming to formula (I)

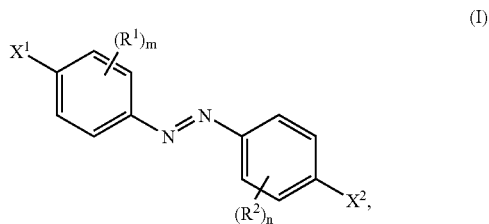
(I)

wherein $R^1$ and $R^2$ independently of one another denote hydrogen or a non-ionic substituent and m and n independently of one another denote an integer from 0 to 4, —$X^1$ and —$X^2$ independently from one another denote at least one member selected from the group consisting of —$S^1$—$T^1$—$(Q^1)_i$—$X^{1'}$— and a member selected from the group consisting of —$X^{1'}$—$R^3$, hydrogen, halogen, cyano, nitro, $CF_3$ and $CCl_3$ wherein $Q^1$ denotes —O—, —S—, —(N—$R^5$)—, —C($R^6R^7$)—, —(C=O)—, —(CO—O)—, —(CO—N$R^5$)—, —($SO_2$)—, —($SO_2$—O)—, —($SO_2NR^5$)—, —(C=N$R^8$)—, —(C$NR^8$—$NR^5$)—, —($CH_2$)$_p$—, para- or meta —$C_6H_4$— or a divalent radical of the formulae

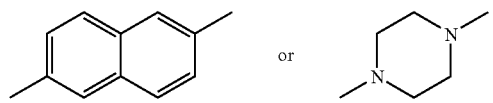

i denotes an integer from 0 to 4, $T^1$ denotes —$(CH^2)_p$—, wherein the chain may be interrupted by —O—, —$NR^9$—, or —$OSiR^{10}{}_2O$—, $S^1$ denotes a direct bond, —O—, —S— or —$NR^9$—, p denotes an integer from 2 to 12, $R^9$ denotes hydrogen, methyl, ethyl or propyl, $R^{10}$ denotes methyl or ethyl, $X^{1'}$ denotes a direct bond, —O—, —S—, —$(NR^5)$—, —$C(R^6R^7)$—, —(C=O)—, —(CO—O)—, —(CO—$NR^5$)—, —$(SO_2)$—, —$(SO_2$—O)—, —$(SO_2$—$NR^5)$—, —(C=$NR^8)$— or —($CNR^8$—$NR^5)$—, $R^3$, $R^5$ and $R^8$ independently of one another denote hydrogen, $C_1$–$C_{20}$-alkyl, $C_3$–$C_{10}$-cycloalkyl, $C_2$–$C_{20}$-alkenyl, $C_6$–$C_{10}$-aryl, $C_1$–$C_{20}$-alkyl-(C=O)—, $C_3$–$C_{10}$cycloalkyl-(C=O)—, $C_2$–$C_{20}$-alkenyl-(C=O)—, $C_6$–$C_{10}$-aryl-(C=O)—, $C_1$–$C_{20}$-alkyl-$(SO_2)$—, $C_3$–$C_{10}$-cycloalkyl-$(SO_2)$—, $C_2$–$C_{20}$-alkenyl-$(SO_2)$— or $C_6$–$C_{10}$-aryl-$(SO_2)$—, and $R^6$ and $R^7$ independently of one another denote hydrogen, halogen, $C_1$–$C_{20}$-alkyl, $C_1$–$C_{20}$-alkoxy, $C_3$–$C_{10}$-cycloalkyl, $C_2$–$C_{20}$-alkenyl or $C_6$–$C_{10}$-aryl, b) at least one form anisotropic grouping conforming to formula (III)

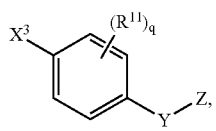

(III)

wherein

Z denotes a radical of the formulae

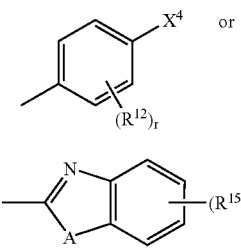

(IIIa)

(IIIb)

wherein

A denotes O, S or N—$C_1$–$C_4$-alkyl, $X^3$ denotes a spacer group of the formula —$X^{3'}$—$(Q^2)_1$—$T^2$—$S^2$—, $X^4$ denotes a member selected from the group consisting of $X^{4'}$—$R^{13}$, hydrogen, halogen, cyano, nitro, $CF_3$ and $CCl_3$, $X^{3'}$ and $X^{4'}$ independently of one another denote a direct bond, —O—, —S—, —$(NR^5)$—, —$C(R^6R^7)$—, —(C=O)—, —(CO—O)—, —(CO—$NR^5$)—, —$(SO_2)$—, —$(SO_2$—O)—, —$(SO_2$—$NR^5)$—, —(C=$NR^8)$— or —($CNR^8$—$NR^5)$—, $R^5$, $R^8$ and $R^{13}$ independently of one another denote hydrogen, $C_1$–$C_{20}$-alkyl, $C_3$–$C_{10}$-cycloalkyl, $C_2$–$C_{20}$-alkenyl, $C_6$–$C_{10}$-aryl, $C_1$–$C_{20}$-alkyl-(C=O)—, $C_3$–$C_{10}$-cycloalkyl-(C=O)—, $C_6$–$C_{10}$-aryl-(C=O)—, $C_2$–$C_{20}$-alkenyl-(C=O)—, $C_1$–$C_{20}$-alkyl-$(SO_2)$—, $C_3$–$C_{10}$-cycloalkyl-$(SO_2)$—, $C_2$–$C_{20}$-alkenyl-$(SO_2)$— or $C_6$–$C_{10}$-aryl-$(S_2)$—, or $R^6$ and $R^7$ independently of one another denote hydrogen, halogen, $C_1$–$C_{20}$-alkyl, $C_1$–$C_{20}$-alkoxy, $C_3$–$C_{10}$-cycloalkyl, $C_2$–$C_{20}$-alkenyl or $C_6$–$C_{10}$-aryl, Y denotes a single bond, —COO—, OCO—, —CONH—, —NHCO—, —CON($CH_3$)—, —N($CH_3$)CO—, —O—, —NH— OR —N($CH_3$)—, $R^{11}$, $R^{12}$, $R^{15}$ independently of one another denote hydrogen, halogen, cyano, nitro, $C_1$–$C_{20}$-alkyl, $C_1$–$C_{20}$-alkoxy, phenoxy, $C_3$–$C_{10}$-cycloalkyl, $C_2$–$C_{20}$-alkenyl or $C_6$–$C_{10}$-aryl, $C_{1-C20}$-alkyl-(C=O)—, $C_6$–$C_{10}$aryl-(C=O)—, $C_1$–$C_{20}$-alkyl-$(SO_2)$—, $C_1$–$C_{20}$-alkyl-(C=O)—O—, $C_1$–$C_{20}$-alkyl-(C=O)—NH—, $C_6$–$C_{10}$-aryl-(C=O)—NH—, $C_1$–$C_{20}$-alkyl-O—(C=O)—, $C_1$–$C_{20}$-alkyl-NH—(C=O)— or $C_8$–$C_{10}$-aryl-NH—(C=O)—, q, r and s independently of one another denote an integer from 0 to 4, $Q^2$ denotes —O—, —S—, $(NR^5)$—, —$C(R^6R^7)$—, —(C=O)—, —(CO—O)—, —(CO—$NR^5$)—, —$(SO_2)$—, —$(SO_2$—O)—, —$(S_2$—$NR^5)$—, —(C=$NR^8)$—, —($CNR^8$—$NR^5)$—, —$(CH_2)_p$—, para- or metha-$C_6H_4$— or a divalent radical of the formulae

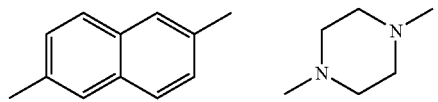

j denotes an integer from 0 to 4, wherein for j>1 the individual $Q^2$ may differ one from the others, $T^2$ denotes —$(CH_2)_p$—, wherein the chain may be interrupted by —O—, —$NR^9$—, or —$OSiR^{10}{}_2O$—, $S^2$ denotes a direct bond, —O—, —S— or —$NR^9$—, p denotes an integer from 2 to 12, $R^9$ denotes hydrogen, methyl, ethyl or propyl, $R^{10}$ denotes methyl or ethyl with the proviso that the side chains contain at least one member selected from the group consisting of c1) azobenzene dye of formula (I) where at least one of $Q^1$, $X^{1'}$, $X^{3'}$ and $X^{4'}$ are $NR^5$, $CONR^5$, $SO_2NR^5$, or $CNR^8$—$NR^5$ and $R^5$ denotes $C_2$–$C_{10}$-alkyl-OH or $CH_2$—(CH—OH)—$CH_2$—OH and c2) monomer conforming to (VI) and/or (VIa)

(VI)

wherein

R' and R" independently of one another denote $C_nH_{2n+1}$ or $C_nH_{2n}$—OH, where n=1 to 10, or together denote a —$C_nH_{2n}$-bridge where n=2 to 6, a —$(C_2H_4O)_n$—$C_2H_4$-bridge, where n=1 to 5, or a —$C_2H_4$—N($C_nH_{2n+1}$)—$C_2H_4$-bridge where n=1 to 6, and R=H or methyl, and

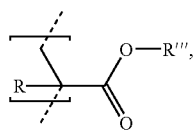

(VIa)

wherein

R''' denotes the radical —$C_nH_{2n}$—OH where n=1 to 10, the radical —$(C_2H_4$—$O)_n$—H where n=2 to 4, or the radical —$C_nH_{2n}$—C(=O)NR''''R'''' where n=2 to 10, where R'''' and R'''' either independently of one another denote $C_nH_{2n+1}$ or $C_nH_{2n}$—OH, where N=1 to 10, or together denote a —$C_nH_{2n}$-bridge where n=2 to 6, a —$(C_2H_4$—$O)_n$—$C_2H_4$-bridge, where n=1 to 5, or a —$C_2H_4$—N($C_nH_{2n+1}$)—$C_2H_4$-bridge where n=1 to 6, and R=H or methyl.

2. The polymeric material of claim 1 wherein side chains further include d) at least one monomer unit that is incorporated to achieve a specific reduction of the dye content and/or mesogene content in the material.

3. The polymeric material of claim 1 characterized in that the dye of formula (I) and the anisotropic groups of formula (III) are covalently bonded to the main polymer chain via flexible spacers.

4. The polymeric material of claim 1 wherein $R^5$ of formula (I) denotes $C_2$–$C_{10}$-alkyl OH.

5. An optical recording medium comprising the polymeric material of claim 1 in the form of a layer or a film.

* * * * *